Figure 1:
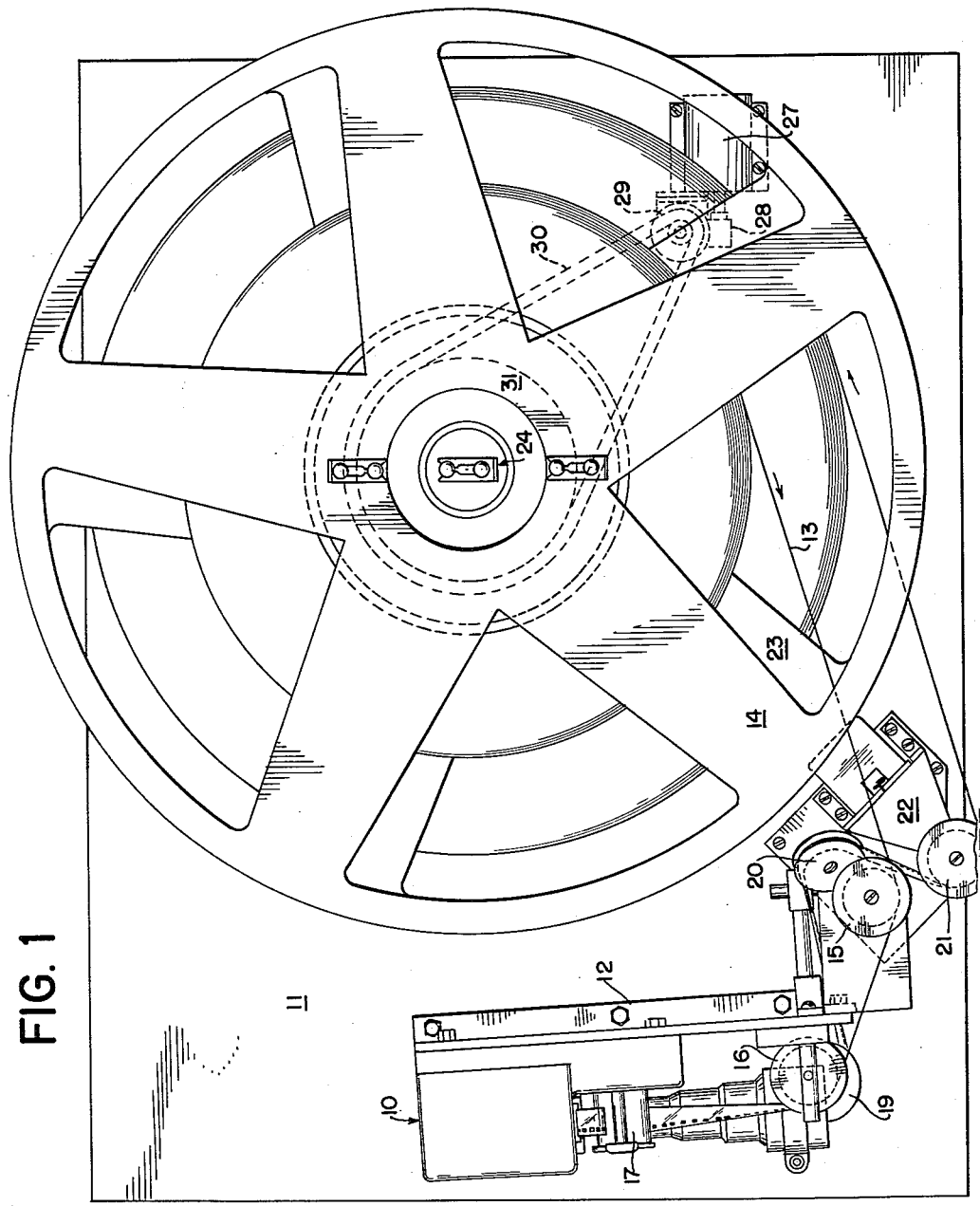

Jan. 21, 1964  M. W. CHITTY  3,118,629
MOTION PICTURE FILM TENSIONING DEVICE
Filed Nov. 29, 1961  3 Sheets-Sheet 1

INVENTOR
MICHAEL W. CHITTY
BY
ATTORNEYS

Jan. 21, 1964    M. W. CHITTY    3,118,629
MOTION PICTURE FILM TENSIONING DEVICE
Filed Nov. 29, 1961    3 Sheets-Sheet 2

INVENTOR
MICHAEL W. CHITTY
BY
ATTORNEYS

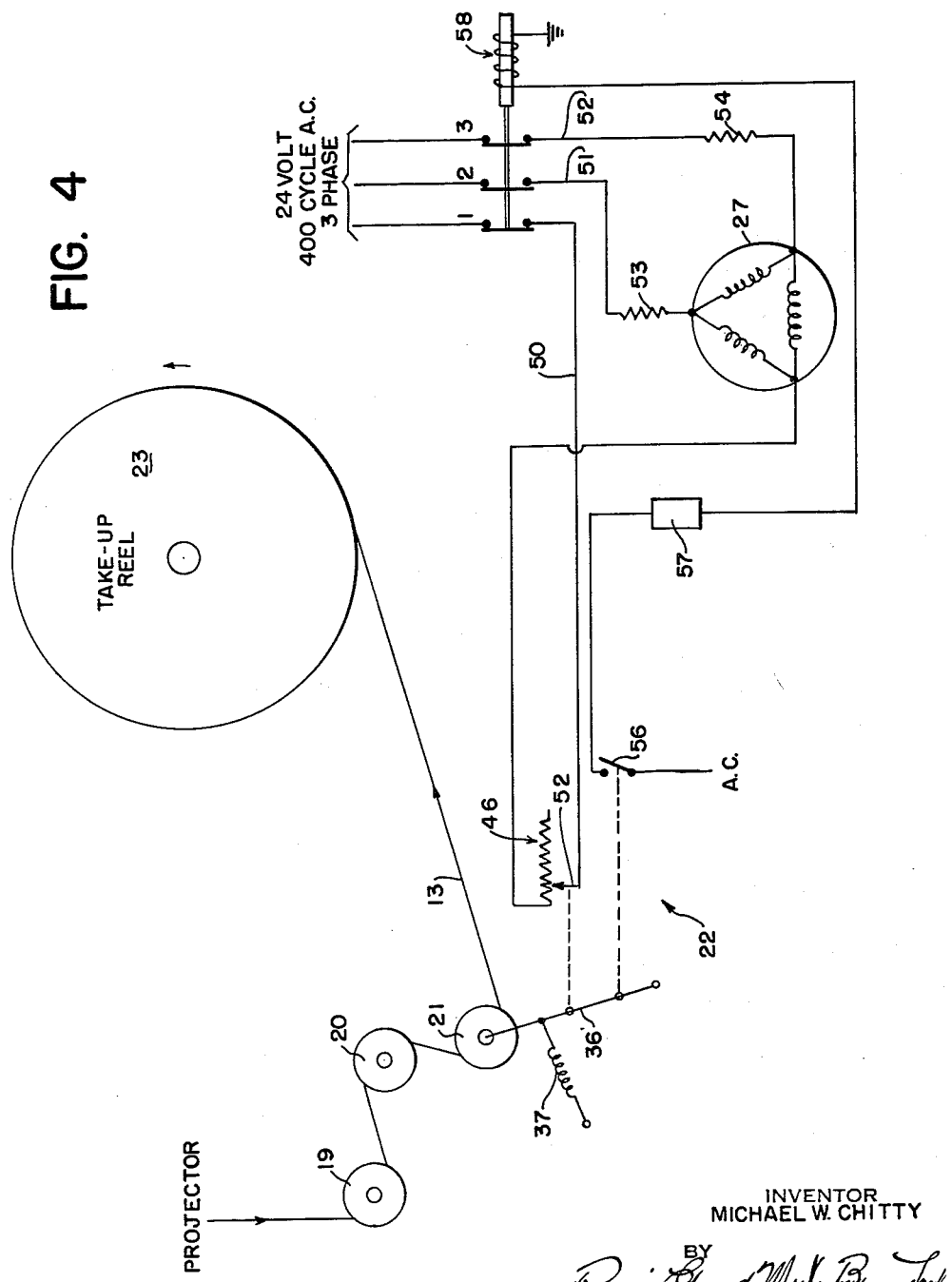

United States Patent Office 3,118,629
Patented Jan. 21, 1964

3,118,629
MOTION PICTURE FILM TENSIONING DEVICE
Michael W. Chitty, Huntington, N.Y., assignor, by mesne assignments, to Inflight Motion Pictures, Inc.
Filed Nov. 29, 1961, Ser. No. 155,592
3 Claims. (Cl. 242—55.11)

This invention relates to motion picture projection apparatus and more particularly to a film tensioning control mechanism for controlling film tension between a motion picture projector and the take-up reel thereof.

The present invention was devised in conjunction with the development of a motion picture projection system for presenting full-length motion picture performances in passenger aircraft during flights of sufficient duration. Since the projection system, during flight, is entirely untended by service or air-crew personnel, the entire footage of a full-length motion picture is mounted upon a single supply reel and is fed from the projector to a take-up reel of equal capacity. The running footage of a full-length motion picture film is approximately 5,000 feet, necessitating reels having a diameter of approximately 24 inches, and each of the reels when fully loaded weighs approximately 20 pounds, of which 15 to 17 pounds is film weight.

A separate electrical drive motor is provided for rotating the take-up reel. The torque and speed requirements of the motor are varied in accordance with the present invention to control and optimize the tension of the film as is passes from the projector to the take-up reel. Film tension regulating devices per se are known, however, in the present instance, the tension adjusting mechanism of the invention was devised specifically to solve unique problems arising from performances given during flight.

The motion picture system of which the present invention forms a part, is energized by the standard 24-volt, 400-cycle aircraft power system. Projection may be initiated simply by actuation of a control switch in the cockpit. Conversely, should the need arise because of flight emergency during a performance, the pilot may stop the operation of the system for any necessary period, after which he may again initiate projection.

It has been found that the present film tension control is particularly useful in adjusting film tension under the interrupted condition just described. It will be appreciated that should the performance be, for example, one-half or three-quarters completed when an interruption in operation occurs, the take-up reel will be then loaded with 8 to 12 pounds weight of film. Under this condition when the drive motor is started, it will attempt, by maximum torque output, to overcome the large initial load. Unless an extremely accurate and immediately responsive tensioning control is used to regulate the torque of the take-up reel drive motor, it is quite likely that the film will be snapped when the slack is taken up in the film from the projector to the take-up reel. Since air-crew personnel are not trained to service the system, such film breakage will effectively cause the performance to cease.

It is therefore a primary aspect of the invention to provide a film tension regulating device which directly senses the tension of film passing from a projector to an adjacent take-up reel and upon increase of such tension, to reduce the output torque and speed of the motor driving the take-up reel. In combination with the tension regulating mechanism I provide a means for breaking the power supply to the aforementioned drive motor, after a predetermined time and in the absence of film tension.

More specifically, I provide in combination with a film take-up reel and an electrical drive motor therefor, an arm intermediate a projector and the take-up reel which is movable against reference spring tension in accordance with varying tension of the film. The tension arm is linked to a variable resistance in the power circuit of the drive motor such that increasing film tension will move the arm and thus change the value of the resistance to effect a reduction in output torque and speed. Advantageously, I provide a correlative circuit and means to energize said circuit by the movement of the tension arm to break the power connection to the drive motor when the arm senses the absence of film tension for a predetermined interval of time.

Figure 2:
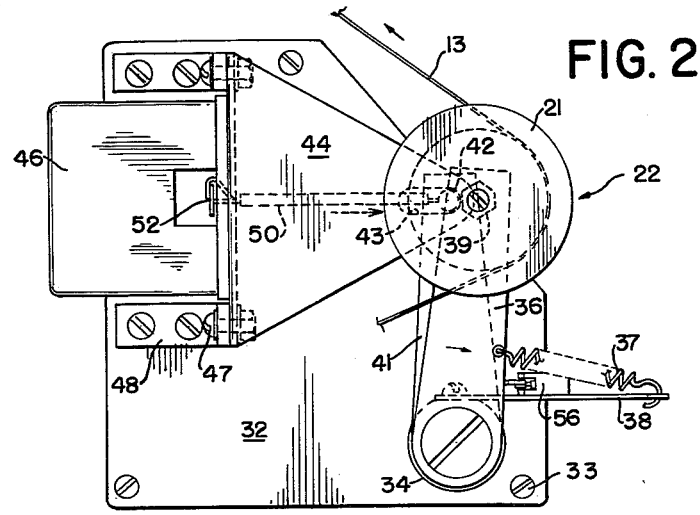
Figure 3:
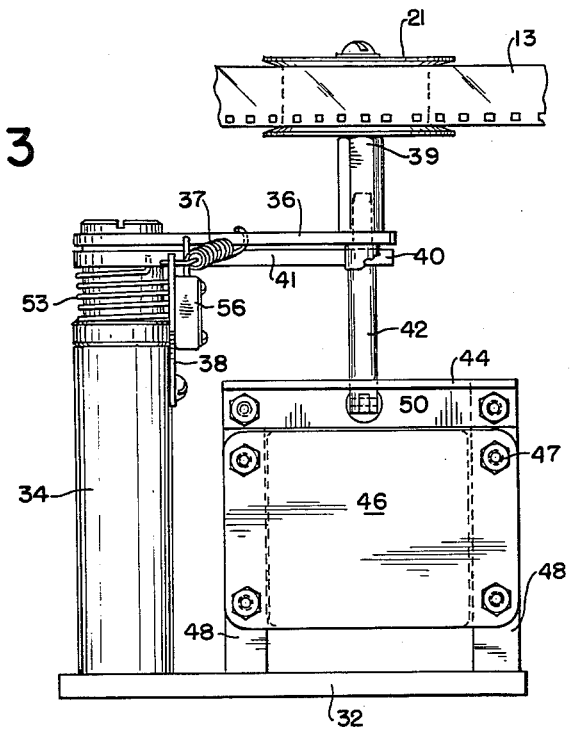

In the following description reference is made, by way of a non-limiting example, to one form of construction of a film tension regulating device devised in accordance with the invention and illustrated in the accompanying drawing in which:

FIG. 1 is a plan view of a projector unit incorporating the tension sensing and regulating mechanism of the invention;

FIGS. 2 and 3 respectively are detailed plan and elevation views of the tension regulating mechanism; and FIG. 4 is a schematic representation of an electrical circuit used in combination with the mechanical elements of the tension regulating mechanism of the invention.

Referring now to the drawing, and initially to FIG. 1 thereof, a projector 10 is shown which is mounted upon a frame 11 by mounting bolts 12. Film 13 is passed from an upper, horizontal supply reel 14 around a pair of guide rolls 15, 16 to the feed or input sprocket assembly 17 of the projector. Film passing from the projector first passes around guide rolls 19, 20, thence around a roll 21 forming part of a tension regulating mechanism 22, and therefrom to a take-up reel 23. The reels 14 and 23 are each mounted horizontally with respect to the projector upon a vertical mounting post indicated generally by the reference numeral 24. The details of the film reel mounting arrangement have been disclosed in the co-pending application Serial No. 155,593 filed November 29, 1961. It will be sufficient to state that the reels 14 and 23 being thus horizontally disposed, occupy a minimum height despite their large diameter. The respective guide rolls 15, 16 and 19–21 assist in the vertical-horizontal re-orientation of the film 13 between the projector and the reels 14, 23.

As shown in FIG. 1, the lower take-up reel 12 is driven by a drive motor 27 which in the particular embodiment is a 24-volt, three phase, 400-cycle motor. The motor 27 drives a worm gear 28 which meshes with a combination pinion and pulley 29. The latter drives a belt 30 attached to a larger diameter pulley 31 connected to the take-up reel 23.

As best seen in FIGS. 2 and 3, the tension regulating device 22 of the present invention comprises a mounting plate 32 which is affixed by attach screws 33 to the frame 11. The plate 32 mounts a vertical post 34, which at the upper end thereof is pivotally connected to a tension sensing arm 36. The arm 36 is biased clockwise by a tension spring 37 whose fixed end is affixed to a bracket 38 mounted to the post 34. The arm 36 carries an upright shaft 39 which is pivotally connected to the roll 21. The arrangement is such that the spring 37 will move the roll 21 against the film 13 and conversely, the arm 36 may be pivoted counter-clockwise against the tension of the spring 37 upon an increase in tension of the film. During the latter movement, the arm 36 which carries a pin 40 beneath its outer end will, through the agency of the pin 40 come into contact with a second arm 41 which is pivotally connected to the post 34. The arm 41 carries a depending vertical link 42 which extends through an elongated slot 43 in a horizontal plate 44. The plate 44 is mounted to the top of a variable resistance unit 46 by means of attached bolts 47 having mounting flanges 48. The lower end of the link 42, which is carried by the arm 41, is connected beneath the plate 44 to a horizontal link 50 whose end opposite the link 42 is connected to a variable resistance contact arm 52.

The lower arm 41 is biased by a coil spring 53 in relation to the post 34 so that when a minimum film tension is sensed, or in the absence of tension, the link 42 will be moved clockwise in relation to the post 34 to the extreme right of the slot 43, or into the position shown in FIG. 2. However, upon increased tension of the film 33 causing counter-clockwise movement of the tension sensing arm 36, the pin 40 attached to the arm 36 will move into contact with the arm 41. Upon further increase in film tension above a prescribed value, the pin 40 and arm 36 will move the arm 41 toward the left as viewed in FIG. 2 and will cause a corresponding lateral movement of the resistance contact arm 52 within the variable resistance unit 46. Such movement will increase the resistance output of the mechanism 46 to effectively reduce the torque and speed of the drive motor. Thereafter, the tension of the film 13 will decrease, permitting a return movement of the arms 36 and 41 until an optimum film tension value is achieved. In the present embodiment, the settings of the resistances in the electrical circuit of FIG. 4, to be described presently, will result in an optimum film tension value of approximately 13 ounces.

Referring now to the schematic diagram of FIG. 4, the elements previously described in connection with FIGS. 1–3 have been identified by the same reference numerals. Thus, the film 13 is shown initially passing from the projector to guide rolls 19 and 20, then about the film tension roll 21 of the tension arm 36 before being taken up by the reel 23. The arm 36 is shown biased by spring 37 in a counter-clockwise direction, the spring 37 serving as a reference spring against film tension. In FIG. 4 the arm 36, as illustrated, is connected to the arm 52 for adjusting the resistance of the variable resistance member 46. However, in the structurally detailed form illustrated in FIGS. 2 and 3, the arm 52 is connected to a separate arm 41 which is movable with the arm 36 when the latter senses the increase of film tension beyond a predetermined initial value.

The take-up reel drive motor 27 is a 3-phase, 400-cycle, 24-volt motor, each phase being connected respectively to leads 50—52. The leads 51, 52 each contain resistors 53, 54 which are set at a predetermined value compatible with an initial resistance setting of the arm 52, respective of the variable resistance unit 46, to provide an optimum initial torque and speed output of the motor 27 in the absence of corrective movement by the tension sensing arm 36. The intial setting of the arm 41 will correspond to maximum torque output of motor 27. Should the tension of the film 13 increase sufficiently to cause movement of the arm 36, and in turn, movement of the variable resistance contact arm 52, such movement of the arm 36 will increase the value of the resistance output of the unit 46 to reduce the output torque and speed of the motor 27. The arm 36 therefore immediately and directly senses increasing film tension to reduce the driving torque of the motor to maintain the film tension below a predetermined maximum. The damping characteristics of the unit 46 are such that movements of the arm 52 will not be followed by indiscriminate fluctuations in the torque of the drive motor. A variable resistance unit which has proved entirely satisfactory for the intended use is manufactured by Electric Regulator Company, Stamford, Connecticut under the trade name "Regohm."

The tension sensing arm 36 is additionally adapted to actuate a switch 56 having an actuator arm 56a (see FIG. 3). The switch 56 when closed, will connect A.-C. power to a thermistor 57 having a negative temperature co-efficient. The thermistor 57 is series connected to the coil of an A.-C. relay 58. After a predetermined period, the thermistor 57 will energize the relay 58 to open the normally closed contact sections 1, 2 and 3 to de-energize the motor 27. The purpose of the circuit including the switch 56, thermistor 57 and relay 58 is to de-energize motor 27 should the absence of film tension be sensed by the arm 36 for a predetermined period of time, for example, in the case that the film 13 should break. However, should the film 13 passing around the sensing roll 21 merely be slack, as might occur when the projector is initially operated, the time delay provided by the thermistor 57 will permit the take-up reel 23 to be driven by motor 27 until increasing tension of film 13 causes the arm 36 to deactivate the switch 56.

The foregoing described film tension regulating device is particularly useful in conjunction with a motion picture system designed for in-flight operation. The tension regulating mechanism of the invention directly senses film tension and is able rapidly to correct and reduce possible high-output torque of the take-up reel drive motor should the latter be energized when the take-up reel is heavily loaded with film. The regulating mechanism, under this condition, is able quickly to sense and to correct for extremely rapid increases in film tension as the film proceeds from a slackened disposition to a normal running condition.

It will be understood that the above description relates to a particular embodiment and is merely representative. In order to understand fully the spirit and scope of the invention, reference should be made to the appended claims in which:

I claim:

1. A film tension regulating device adapted to vary the tension of film passing from a motion picture projector to a take-up reel adjacent thereto, comprising a tension sensing arm pivotally connected to a mounting post, a roll attached to said arm for contacting said film, resilient means attached to said arm such that increasing tension of said film moves said arm against the resilient means, a second arm pivotally connected to said post and rotatable relative thereto concentrically with the tension arm, stop means on said tension arm for contacting said second arm after predetermined rotation of said tension arm in response to increasing film tension, spring means biasing said second arm toward said tension arm, stop means limiting movement of said second arm toward said tension arm, an electric drive motor, means connecting said drive motor and reel for causing said reel to take-up film from the projector, a motor circuit, balanced resistance means in said circuit for limiting the output torque and speed of said drive motor to predetermined maximum values, variable resistance means in said circuit connected to said second arm and movable therewith and with said tension arm to increase resistance in said circuit upon increasing film tension above a preselected minimum optimum value, said increasing resistance effecting a corresponding decrease in the output torque and speed of said motor, said tension arm being movable for a predetermined distance by said resilient means independently of said second arm upon decreasing film tension to actuate means for de-energizing said drive motor.

2. A film tension regulating device according to claim 1 in which the tension arm actuates a switch upon movement of said arm after the predetermined distance and in the absence of film tension, said switch conducts current to a thermistor having a negative temperature co-efficient in series therewith, said thermistor being series connected to a relay for actuation of said relay after a predetermined interval, and said relay is connected in the motor circuit to cause contact sections of said relay to open upon energization of said relay thereby causing de-energization of said motor.

3. A film tension regulating device adapted to vary the tension of film passing from a motion picture projector to a take-up reel adjacent thereto, comprising a tension sensing arm, resilient reference means attached to said arm, said arm being movable against said resilient reference means upon increasing tension of said film, a second arm movably and independently connected with respect to said tension sensing arm, said second arm being spring biased toward said tension sensing arm, stop means on said tension arm for contacting said second arm after a predetermined movement of said tension arm in response to increasing film tension, said tension arm thereafter moving said second arm in response to increasing film tension above a minimum optimum value, stop means limiting movement of said second arm toward said tension arm, and electric drive motor, means connecting said drive motor and reel for causing said reel to take-up film from the projector, a motor circuit, variable resistance means in said circuit connected to said second arm to increase resistance in said circuit upon increasing film tension above said minimum optimum value, said increasing resistance effecting a corresponding decrease in the output torque and speed of said motor, whereby a slack condition resulting in film tension below said preselected minimum optimum value effects movement of the tension sensing arm toward the second arm to gradually increase film tension to said minimum optimum value prior to movement of said second arm by the tension arm to increase resistance in said circuit.

References Cited in the file of this patent

UNITED STATES PATENTS

| | | |
|---|---|---|
| 2,398,639 | Heyer | Apr. 16, 1946 |
| 2,506,595 | Horres | May 9, 1950 |
| 2,685,950 | Demby | Aug. 10, 1954 |
| 2,882,788 | Steigman | Apr. 21, 1959 |
| 2,914,265 | Vanderwal | Nov. 24, 1959 |